(12) United States Patent
Daxecker

(10) Patent No.: US 10,550,975 B2
(45) Date of Patent: Feb. 4, 2020

(54) PIVOT AND SWIVEL JOINT HAVING A ROTARY AXIS AND A SWIVEL AXIS

(71) Applicant: B&R INDUSTRIAL AUTOMATION GMBH, Eggelsberg (AT)

(72) Inventor: Thomas Daxecker, St. Georgen am Fillmannsbach (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 402 days.

(21) Appl. No.: 15/358,861

(22) Filed: Nov. 22, 2016

(65) Prior Publication Data

US 2017/0146169 A1 May 25, 2017

(30) Foreign Application Priority Data

Nov. 23, 2015 (AT) ................................ A50995/2015

(51) Int. Cl.
*F16L 27/08* (2006.01)

(52) U.S. Cl.
CPC ....... *F16L 27/0804* (2013.01); *F16L 27/0816* (2013.01)

(58) Field of Classification Search
CPC . F16L 27/0804; F16L 27/0857; F16L 27/107; F16L 27/1085; F16L 27/11; F16L 27/111

(Continued)

(56) References Cited

U.S. PATENT DOCUMENTS 1,351,875 A * 9/1920 Schreiber ................ F16L 27/04
285/146.1
1,475,289 A * 11/1923 Diescher ................. F16L 51/00
285/235

(Continued)

FOREIGN PATENT DOCUMENTS

DE 9310102 7/1993
DE 9313770 9/1993

(Continued)

OTHER PUBLICATIONS

EP Search Report issued in EP Application No. 16 19 8941 (4 pages).

(Continued)

*Primary Examiner* — David Bochna
(74) *Attorney, Agent, or Firm* — Greenblum & Bernstein, P.L.C.

(57) ABSTRACT

For a simply constructed pivot and swivel joint securing a sealing of the control element for the connection of a support arm to a control element, it is provided that the pivot and swivel joint (3) is implemented having a rotary sleeve (10) including an axially continuous recess (41) and having a swivel sleeve (11) connected thereto via a swivel axis (S) including an axially continuous recess (42), which is swivelable relative to the rotary sleeve (10) about the swivel axis (S), a rotary axis (D) being configured at the axial end of the rotary sleeve (10) facing away from the swivel axis (S), and a sealing hose (30) being disposed between the rotary sleeve (10) and the swivel sleeve (11), which by a first axial end sealingly abuts at the recess (41) of the rotary sleeve (10) and by the opposite second axial end is sealingly disposed at the axial end of the swivel sleeve (11).

10 Claims, 3 Drawing Sheets

(58) Field of Classification Search
USPC .................. 285/147.1, 145.5, 226, 229, 235
See application file for complete search history.

(56) References Cited

U.S. PATENT DOCUMENTS

| | | | | |
|---|---|---|---|---|
| 2,549,951 | A * | 4/1951 | Warren | F16L 27/0828 285/226 |
| 3,306,634 | A * | 2/1967 | Groves | F16L 27/0857 285/226 |
| 3,915,482 | A * | 10/1975 | Fletcher | F16L 27/0857 285/226 |
| 4,151,612 | A * | 5/1979 | Vykukal | B64G 6/00 2/2.12 |
| 4,158,462 | A * | 6/1979 | Coral | B08B 15/002 285/226 |
| 5,211,602 | A * | 5/1993 | Holmgren | F16L 27/0857 285/114 |
| 5,336,130 | A * | 8/1994 | Ray | F16L 27/0857 454/65 |
| 6,945,567 | B2 * | 9/2005 | Fleck | F16L 27/108 285/229 |
| 8,016,325 | B2 * | 9/2011 | Gosis | F16L 27/026 285/147.1 |
| 2005/0161945 | A1 * | 7/2005 | Cheng | F16L 27/0857 285/184 |
| 2011/0073366 | A1 * | 3/2011 | Jaffari | F16L 27/107 174/84 R |
| 2015/0176753 | A1 | 6/2015 | Esterbauer | |
| 2016/0025251 | A1 * | 1/2016 | Uhler | A62C 35/68 137/615 |
| 2016/0069491 | A1 * | 3/2016 | Holbach | F16L 27/1085 285/223 |

FOREIGN PATENT DOCUMENTS

| | | |
|---|---|---|
| DE | 200 21 626 | 3/2001 |
| EP | 0 496 191 | 7/1992 |
| WO | WO2014/009188 | 1/2014 |

OTHER PUBLICATIONS

Austrian Search Report issued in AU Application No. A50995/2015 dated Oct. 13, 2016.

* cited by examiner

PIVOT AND SWIVEL JOINT HAVING A ROTARY AXIS AND A SWIVEL AXIS

CROSS-REFERENCE TO RELATED APPLICATIONS

The present application claims priority under 35 U.S.C. § 119(a) of Austrian Application No. A50995/2015 filed on Nov. 23, 2015, the disclosure of which is expressly incorporated by reference herein in its entirety.

BACKGROUND OF THE INVENTION

Field of the Invention

The present invention relates to a sealed pivot and swivel joint having a rotary axis and a swivel axis, preferably for the connection of a support arm to a control element.

Description of Related Art

In the industrial environment, control elements, for example display units, control panels, control units, input/output devices, etc., are used to monitor and control production equipment or production lines. In this instance, such control elements are subjected to high demands on the robustness and, in particular, also on tightness to enable a simple cleaning of the production equipment or production line, including the control element. During cleaning, the surfaces are often simply sprayed off using a high-pressure cleaning spray jet. In this instance, the penetration of cleaning agents, or more generally of liquids, into the control element has to be prevented since the control element otherwise could be damaged or destroyed by the penetrating liquid.

Such control elements are often situated on support arms which, for example, are suspended from ceilings or are situated at machine parts. For this purpose, as a rule it is also desired that the position of the control element is adjustable to enable a simple adaptation to the operating personnel or to local conditions. To this end, a pivot joint is often provided, by which the control element is rotatable relative to the support arm about the axis of the support arm. An example is to be found in publication WO 2014/009188 A1. A support arm connection of a control panel, into which a support arm is insertable, is therein described and, in doing so, a pivot joint having a large pivot range is formed. In addition, a sealing ring is situated at the support arm, which seals between the support arm and the support arm holder at the control panel and thus prevents liquid from penetrating into the control panel.

Such a pivot joint by itself is however often not sufficient to enable a flexible adjustment of a control element. For this reason, swivel joints are often also provided to enable a swiveling of the control element about an axis perpendicular to the axis of the support arm. This, however, necessarily means that the support arm may no longer be able to be attached to the control element, since a rigid support arm passing through the joint would make such a swiveling impossible or require a complex swivel mechanism of the control element. If the control element is not directly situated at the support arm, such as in WO2014/009188 A1, a sealing may also no longer take place at this point. As a consequence, liquid could penetrate into the control element via the swivel joint.

In addition, it is also often the case that the wiring for the control element is fed through the support arm, which also may complicate the sealing and the implementation of a swivel joint.

SUMMARY OF THE INVENTION

It is therefore an object of the present invention to indicate a pivot and swivel joint for the connection of a support arm to a control element, which is constructed in a very simple manner, enables a simple feed-through of a wiring for the control element and ensures a secure sealing of the control element.

According to the present invention, this object is achieved in that the pivot and swivel joint is implemented using a rotary sleeve having an axially continuous recess and using a swivel sleeve having an axially continuous recess thereto connected via a swivel axis, the swivel sleeve relative to the rotary sleeve being able to be swiveled about the swivel axis, and a rotary axis being configured at the axial end of the rotary sleeve facing away from the swivel axis, and a sealing hose being situated between the rotary sleeve and the swivel sleeve, which by a first axial end sealingly abuts at the recess of the rotary sleeve and by an opposite second axial end is sealingly disposed at the axial end of the swivel sleeve. The sealing hose may seal the area of feed-through through the pivot and swivel joint in a simple manner against fluids. In this instance, the sealing hose simultaneously also forms a part of the feed-through through the pivot and swivel joint, through which a wiring for the control element may be fed-through.

Advantageously, the first axial end of the sealing hose is implemented as a first sealing flange, which axially abuts at a seal shoulder in the rotary sleeve. Using a sealing flange, a defined sealing face may be configured, which may produce a seal in a simple and secure manner. For this purpose, it may be provided that a pressure disk presses the first sealing flange against the seal shoulder. In so doing, a very simple and at the same time secure attachment of the sealing hose to the rotary sleeve may be produced.

Preferably, the other end of the sealing hose is implemented as a second sealing flange axially abutting at an axial end face of the swivel sleeve facing away from the swivel axis. In turn, using the sealing flange, a defined sealing face may be configured, by which a sealing may be produced in a simple and secure manner. For a better centering and positioning, an axial recess for accommodating the second sealing flange may also be provided at the axial end face of the swivel sleeve.

If the second sealing flange axially protrudes from the axial end face of the swivel sleeve, the sealing flange may be compressed when installing the pivot and swivel joint, as result of which a particularly good seal may be ensured.

In order to enable a simple assembly of the pivot and swivel joint, a number of radially inwardly positioned webs may be disposed at the second axial end of the sealing hose. At the webs, the sealing hose may be easily gripped and be pulled through the pivot and swivel joint.

In an advantageous, simple embodiment, the swivel joint is formed by two bolts, each of which is inserted into flush aligned bore bearings at the rotary sleeve and at the swivel sleeve.

In an advantageous, simple embodiment, the pivot joint is formed by a housing ring attached to the rotary sleeve and by a support arm ring disposed in a rotary manner between the housing ring and a stop in the rotary sleeve.

BRIEF DESCRIPTION OF THE DRAWINGS

In the following, the present invention is described in greater detail in reference to FIGS. 1 through 4, which show advantageous embodiments of the present invention in an exemplary, schematic and non-restrictive manner.

DETAILED DESCRIPTION OF THE INVENTION

Figure 1:
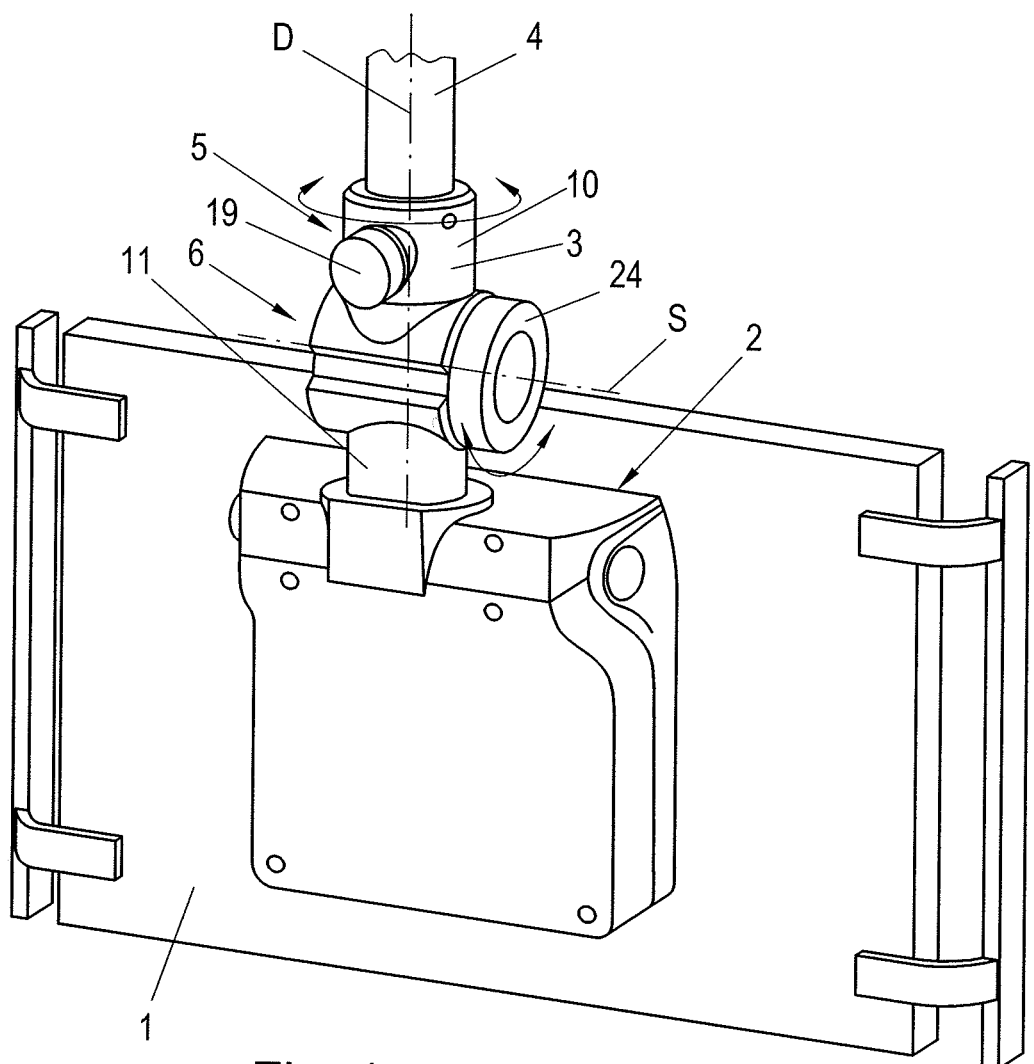
FIG. 1 shows a view of a control element having a pivot and swivel joint and a support arm.

FIG. 1 shows a control element 1 having a suspension component 2 at which a pivot and swivel joint 3 according to the present invention may be situated. In turn, a support arm 4 is attached in pivot and swivel joint 3. Support arm 4 may, for example, be attached at a stationary component (not shown), such as the ceiling or a machine component.

Figure 2:
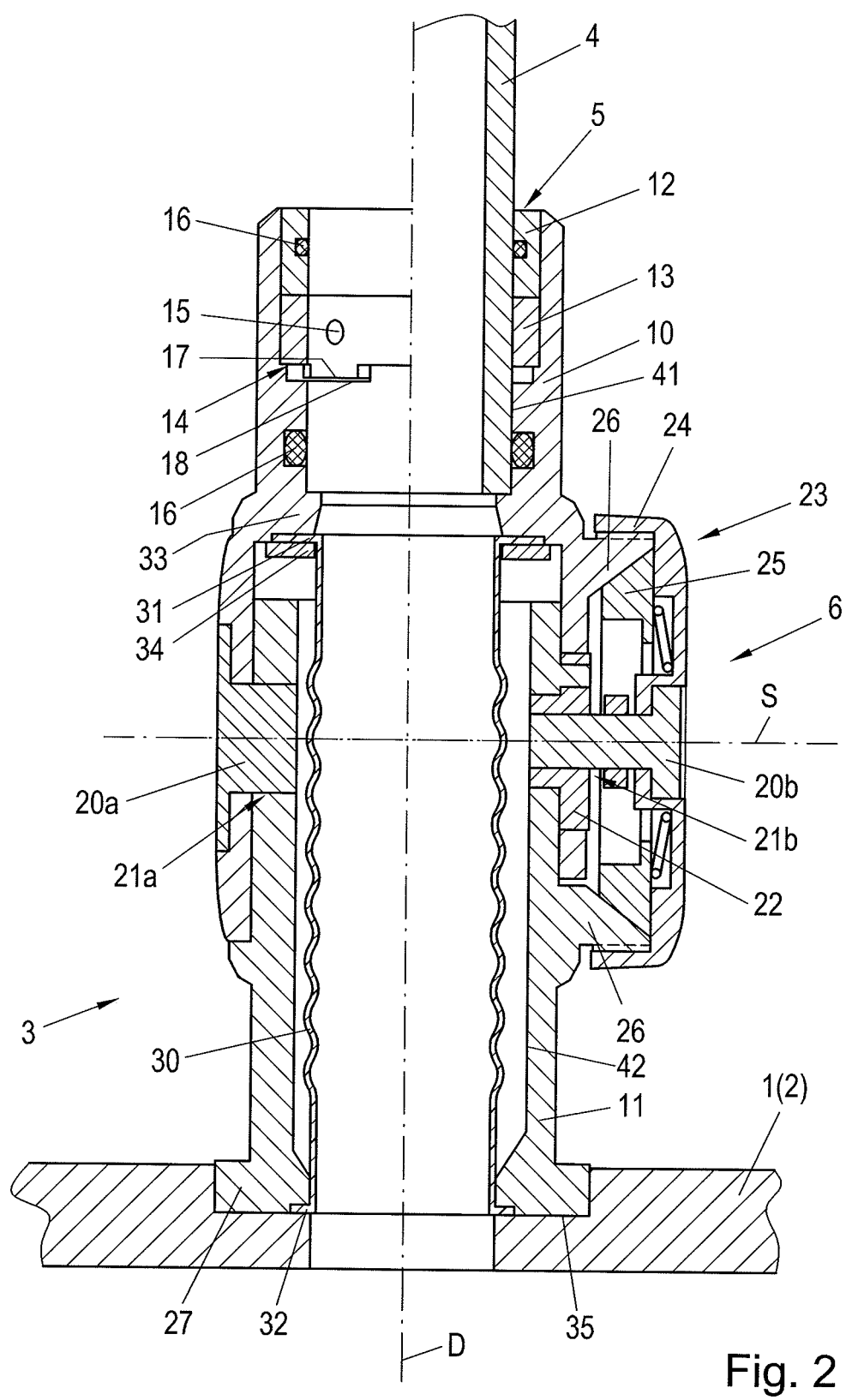
FIG. 2 shows a longitudinal section through the pivot and swivel joint.

Pivot and swivel joint 3 includes a pivot joint 5 and a swivel joint 6. Pivot joint 5 may be implemented in any manner and allows for the rotation of pivot and swivel joint 3 vis-a-vis fixed support arm 4 about rotary axis D of support arm 4. Advantageously, pivot joint 5 is implemented according to WO 2014/009188 A1. Swivel joint 6 enables the swiveling of control element 1 about a swivel axis S, which is inclined relative to rotary axis D. To obtain ease in adjustability for control element 1, it is meaningful if swivel axis S is inclined by at least 60° and by a maximum of 120° relative to rotary axis D. It is ideal if swivel axis S is substantially perpendicular to rotary axis D. In FIG. 2, pivot and swivel joint 3 is shown in detail as a longitudinal section, only one half of support arm 4 being shown.

Pivot and swivel joint 3 is made up of a rotary sleeve 10 and a swivel sleeve 11 partially situated therein, which are connected to each other by swivel joint 6. Of course, rotary sleeve 10 could also be partially situated within swivel sleeve 11. Swivel sleeve 11 is swivelable relative to rotary sleeve 10 and rotary sleeve 10 is rotatable relative to support arm 4. At the axial end of rotary sleeve 10 facing away from swivel joint 6, pivot joint 5 is configured, as it is subsequently described.

Pivot joint 5 substantially includes two mounting rings, which are disposed axially next to each other, preferably axially abutting against each other. A housing ring 12 is attached at the axial end of rotary sleeve 10 in rotary sleeve 10, for example, using screw 28 for screwing the housing ring to rotary sleeve 10 (see FIG. 4). A support arm ring 13 is disposed between housing ring 12 and a radially inwardly protruding shoulder 14 in rotary sleeve 10, support arm ring 13 being attached to support arm 4, for example, being clamped with the aid of radially aligned screws 15 screwed into support arm ring 13. Preferably, support arm ring 13 in the installed state abuts by its axial end face facing shoulder 14 at shoulder 14. In so doing, housing ring 12, support arm ring 13 and shoulder 14 interact in such a manner that, on the one hand, it is prevented that pivot and swivel joint 3 slides off support arm 4 and, on the other hand, it it ensured that pivot joint 5 may not be pulled out of pivot and swivel joint 3. At the same time, the pivotability about rotary axis D of support arm 4 is thereby however ensured because support arm ring 13 may rotate between shoulder 14 and housing ring 12. Furthermore, a sealing ring 16, for example, an O-ring, which sealingly interacts with support arm 4, is disposed in rotary sleeve 10 and/or at the radially inner circumferential surface of housing ring 12. Sealing ring 16 prevents a penetration of liquids into pivot and swivel joint 3 along the radially outer circumferential surface of support arm 4. Support arm ring 13 at the axial end facing shoulder 14 may also be implemented by an axially protruding nose 17. For this purpose, an axial recess 18 extending in the circumferential direction, into which nose 17 engages, may be provided at shoulder 14. In so doing, the rotation range of pivot joint 5 may be specified via the circumferential length of recess 15. Likewise, stop 19, for example, in the form of a screw, may be provided at rotary sleeve 10 to fixate pivot and swivel joint 3 at a specified position, for example, to clamp the pivot and swivel joint with the aid of a screw (also see FIG. 1). For a detailed description of pivot joint 5, please refer to WO 2014/009188 A1.

It should, however, be noted that pivot joint 5 may also be differently configured, as long as a rotation of pivot and swivel joint 3 about rotary axis D of fixed support arm 4 is made possible.

Swivel axis S is configured by two bolts 20a, 20b, which are inserted through bearing bores 21a, 21b in rotary sleeve 10 and in swivel sleeve 11. A continuous bolt or two connected bolts 20a, 20b would also be possible; however, it would complicate the feed-through of a wiring. If rotary axis D and swivel axis S do not intersect, that is, if swivel axis S is thus excentrically disposed, then a continuous bolt would also be an option. For this purpose, bearing bores 21a, 21b are of course flush aligned along swivel axis S. A bearing bore 21a, 21b could also be provided in an insert part 22, insert part 22 being inserted in recesses in rotary sleeve 10 and in swivel sleeve 11. Insert part 22 may be used to adjust swivel axis S and may also enable a more advantageous material combination with regard to friction and abrasion. In order to fixate the position of swivel sleeve 11 vis-a-vis rotary sleeve 10, a stop 23 may also be provided at swivel axis S. For example, stop 23 is implemented as screw sleeve 24, which presses a friction part 26 at rotary sleeve 10 and/or swivel sleeve 11, here for example a slanted friction surface, against a friction part 25 in the stop therewith interacting, for example a friction plate 25 having a friction surface slanted in the opposite direction. Of course, stop 23 may however also be configured in any other manner. If stop 23 is loosened, swivel sleeve 11 via bolts 20a, 20b may be swiveled vis-a-vis rotary sleeve 10 within a specified angular range about swivel axis S.

At the axial end of swivel sleeve 11 facing away from swivel axis S, a fastening flange 27 is provided, by which pivot and swivel joint 3 may be attached at a component of control element 1, for example, at suspension component 2 of control element 1.

Rotary sleeve 10 and swivel sleeve 11 radially inside are implemented by recesses 41, 42 axially continuous in the direction of rotary axis D, which are at least partially flush aligned, in particular, to enable an axial feed-through of a wiring from support arm 4 to control element 1. In order to prevent that fluid penetrating via swivel joint 6 is not able to enter control element 1 via these recesses 41, 42, a sealing hose 30 is provided. In this instance, sealing hose 30 is by a first axial end sealingly connected at a sealing surface of recess 41 of rotary sleeve 10 and, by the opposite second axial end, is likewise sealingly connected at a sealing surface in the area of the axial end of swivel sleeve 11 facing away from swivel axis S. For this reason, sealing hose 30 extends in the direction of rotary axis D between rotary sleeve 10 and the area of the axial end of swivel sleeve 11.

For the sealing, sealing hose 30 may have a radially protruding sealing flange 31, 32 at both axial ends. First sealing flange 31 facing rotary sleeve 10 sealingly abuts at a sealing surface in recess 41 of rotary sleeve 10. In a preferred embodiment, first sealing flange 31 axially abuts at a seal shoulder 33 in recess 41 of rotary sleeve 10 and is axially sealingly pressed against this seal shoulder 33 by a pressure disk 34. For this purpose, pressure disk 34 may be pressed by screws against rotary sleeve 10. Alternatively, it may be also provided that sealing flange 31 is adhesively bonded to rotary sleeve 10 or that a sealing connection is otherwise established.

Figure 3:
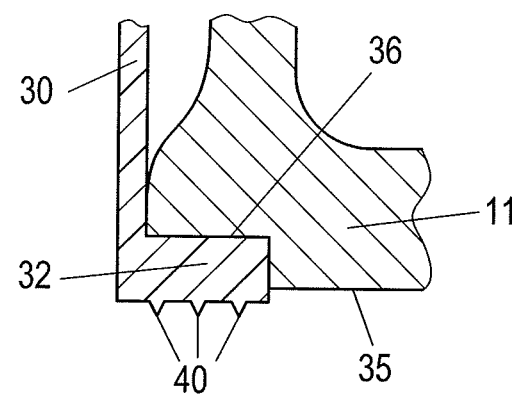
FIG. 3 shows a detail view of the pivot and swivel joint.

Second sealing flange 32 abuts at an axial end face 35 of swivel sleeve 11 facing away from swivel axis S. For this purpose, an axial indentation 36 may also be provided for sealing flange 32 to better accommodate and center sealing flange 32. Preferably, sealing flange 32 in the non-assembled state is at least partially axially removed from end face 35, as it is shown in FIG. 3. If pivot and swivel joint 3 is now attached at control element 1, for example by axially screw-connecting pivot and swivel joint 3 via fastening flange 27 of swivel sleeve 11 to a part of control element 1, second sealing flange 32 is compressed between swivel sleeve 11 and control element 1. As a result, not only may an outward sealing of recess 42 of swivel sleeve 11 be achieved, but a secure seal between swivel sleeve 11 and control element 1 may also be produced. In so doing, no fluid is able to penetrate into control element 1 from the outside between pivot and swivel joint 3 and control element 1. For this purpose, at sealing flange 32, suitable sealing lips 40 may also be provided at the axial end face of sealing hose 30 to increase the seal effect. Second sealing flange 32, when used according to specifications, is therefore sealingly disposed between swivel sleeve 11 and a component of control element 1.

Figure 4:
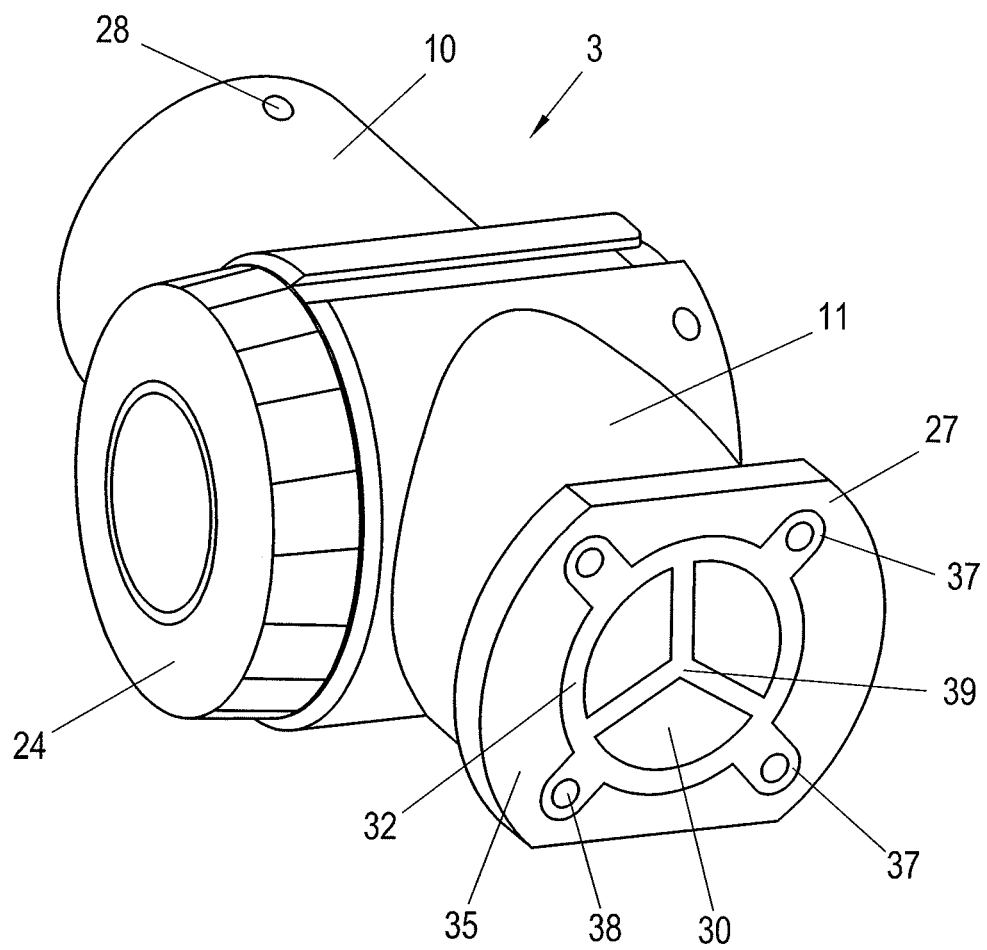
FIG. 4 shows a view of the axial end of the swivel sleeve of the pivot and swivel joint.

FIG. 4 shows a view in the direction of the axial end of swivel sleeve 11. Second sealing flange 32 can be seen, which configures a sealing surface for swivel sleeve 11 as well as also for control element 1. Furthermore, axial threaded holes 38 in fastening flange 27 of swivel sleeve 11 can be seen, via which pivot and swivel joint 3 may be screw-connected to a component of control element 1. Additionally, radially protruding lugs 37 are provided at sealing flange 32 in the area of threaded holes 38, which are to enable an improved fixating and positioning of sealing hose 30.

Radially inwardly positioned webs 39, which preferably are connected to one another, are additionally provided at the axial end of sealing hose 30. These webs 39 are to enable a simpler installation of pivot and swivel joint 3. During installation, sealing hose 30 is first attached to rotary sleeve 10. Afterwards, swivel sleeve 11 is put over sealing hose 30. On account of second sealing flange 32, very flexible sealing hose 30 deforms and pushes axially together. In order to be able to easily pull sealing hose 30 axially outwards through swivel sleeve 11 using sealing flange 32, sealing hose 30 may be easily gripped at webs 39 and pulled through. After installation, webs 39 may also again be removed, for example may be simply cut off.

Preferably, sealing hose 30 is manufactured of a suitable elastomer and is hermetically sealed at the outer circumference. In particular, sealing hose 30 has to be designed in such a manner that no fluid may penetrate from the outside into the interior of sealing hose 30. Thus, sealing hose 30 is able to prevent that fluids possibly penetrating via swivel axis 6 or otherwise penetrating fluids may enter the interior of pivot and swivel joint 3 and, thus, may further enter into control element 1.

Sealing hose 30 is preferably flexible to an extent that a swiveling of swivel sleeve 11 about swivel axis S may take place without noticeable resistance, as a result of which sealing hose 30 is also bent. For this purpose, it may also be provided that sealing hose 30 is configured at least in sections as a bellow, as can be seen from FIG. 2.

A wiring for control element 1 may simply be guided through sealing hose 30. Thus, sealing hose 30 extends the axial recess of housing ring 12 to the axial end of swivel sleeve 11.

What is claimed is:

1. A pivot and swivel joint comprising:
a rotary sleeve comprising a recess, a first end, and a second end opposite the first end;
said rotary sleeve having a center axis that defines a rotary axis (D) of the rotary sleeve;
a swivel sleeve comprising a recess, a first end, and a second end opposite the first end;
said swivel sleeve being movably connected to the rotary sleeve so as to swivel, relative to the rotary sleeve, about a swivel axis (S);
a sealing hose disposed between the rotary sleeve and the swivel sleeve; and
said sealing hose comprising:
a first axial end that sealingly abuts at the recess of the rotary sleeve; and
a second axial end that sealingly engages with the second end of the swivel sleeve,
wherein the first axial end of the sealing hose comprises a sealing flange that axially abuts at a seal shoulder located inside the rotary sleeve.

2. The pivot and swivel joint as recited in claim 1, further comprising a pressure disk configured to press the sealing flange against the seal shoulder.

3. A pivot and swivel joint comprising:
a rotary sleeve comprising a recess, a first end, and a second end opposite the first end;
said rotary sleeve having a center axis that defines a rotary axis (D) of the rotary sleeve;
a swivel sleeve comprising a recess, a first end, and a second end opposite the first end;
said swivel sleeve being movably connected to the rotary sleeve so as to swivel, relative to the rotary sleeve, about a swivel axis (S);
a sealing hose disposed between the rotary sleeve and the swivel sleeve; and
said sealing hose comprising:
a first axial end that sealingly abuts at the recess of the rotary sleeve; and
a second axial end that sealingly engages with the second end of the swivel sleeve,
wherein the second axial end of the sealing hose comprises a sealing flange that axially abuts an axial end face of the swivel sleeve.

4. The pivot and swivel joint as recited in claim 3, wherein the sealing flange of the second axial end is disposed inside an axial indentation in the axial end face of the swivel sleeve.

5. The pivot and swivel joint as recited in claim 4, wherein the sealing flange of the second axial end protrudes from the axial end face of the swivel sleeve.

6. A pivot and swivel joint comprising:
a rotary sleeve comprising a recess, a first end, and a second end opposite the first end;
said rotary sleeve having a center axis that defines a rotary axis (D) of the rotary sleeve;
a swivel sleeve comprising a recess, a first end, and a second end opposite the first end;
said swivel sleeve being movably connected to the rotary sleeve so as to swivel, relative to the rotary sleeve, about a swivel axis (S);
a sealing hose disposed between the rotary sleeve and the swivel sleeve; and
said sealing hose comprising:
   a first axial end that sealingly abuts at the recess of the rotary sleeve; and
   a second axial end that sealingly engages with the second end of the swivel sleeve; and
further comprising:
a housing ring coupled to the rotary sleeve; and
a support arm ring rotatably disposed between the housing ring and a stop located inside the rotary sleeve.

7. A pivot and swivel joint comprising:
a first sleeve comprising a main opening, a first end, and a second end opposite the first end;
said first sleeve having a center axis that defines a rotary axis (D) of the first sleeve;
a second sleeve comprising a main opening, a first end, and a second end opposite the first end;
said first end of the second sleeve being movably connected to the first end of the first sleeve, whereby the second sleeve can swivel relative to the first sleeve about a swivel axis (S);
a sealing hose comprising:
   a portion disposed in an area of the swivel axis (S);
   a first axial end that extends inside the first end of the first sleeve and sealingly engages with a surface of the first sleeve; and
   a second axial end that extends inside the first end of the second sleeve and sealingly engages with a surface of the second end of the second sleeve,
wherein the first axial end of the sealing hose comprises a sealing flange that axially abuts at a seal shoulder located inside the first sleeve.

8. The pivot and swivel joint as recited in claim 7, wherein the second axial end of the sealing hose comprises a sealing flange that axially abuts at a surface located inside the second axial end of the second sleeve.

9. A pivot and swivel joint comprising:
a first sleeve comprising a main opening, a first end, and a second end opposite the first end;
said first sleeve having a center axis that defines a rotary axis (D) of the first sleeve;
a second sleeve comprising a main opening, a first end, and a second end opposite the first end;
said first end of the second sleeve being movably connected to the first end of the first sleeve, whereby the second sleeve can swivel relative to the first sleeve about a swivel axis (S);
a sealing hose comprising:
   a first axial end that extends inside the first end of the first sleeve and sealingly engages with an annular inner surface of the first sleeve;
   a second axial end that extends inside the first end of the second sleeve and sealingly engages with an annular surface of the second end of the second sleeve; and
   a portion that intersects the swivel axis (S) and is disposed between the first and second axial ends,
wherein the first axial end of the sealing hose comprises a sealing flange that axially abuts at a seal shoulder located inside the first sleeve.

10. The pivot and swivel joint as recited in claim 9, wherein the second axial end of the sealing hose comprises a sealing flange that axially abuts at a surface located inside the second axial end of the second sleeve.

* * * * *